Figure 1:
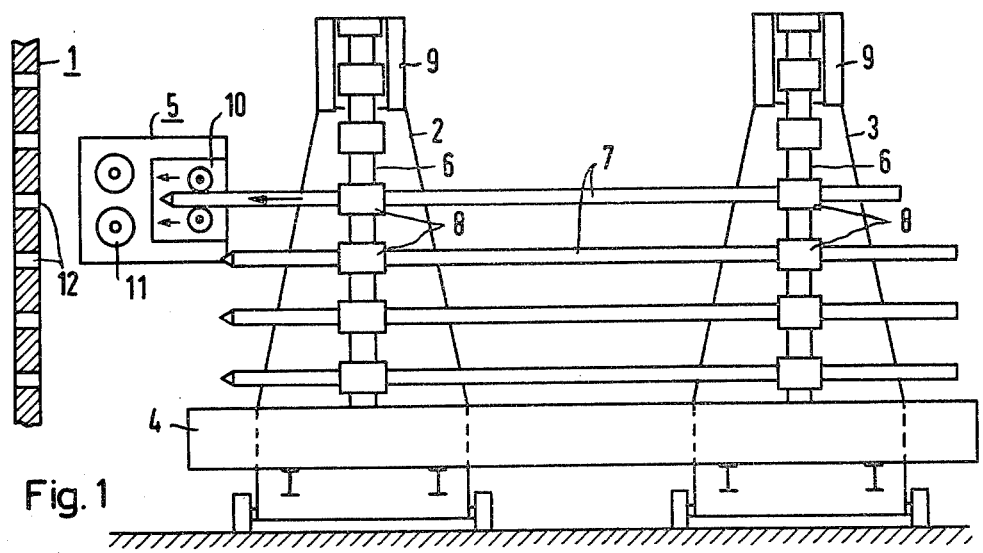

United States Patent [19]

Rethy

[11] 4,221,534
[45] Sep. 9, 1980

[54] DEVICE FOR FEEDING TUBES FOR HEAT EXCHANGERS

[75] Inventor: Alexander Rethy, Mülheim, Fed. Rep. of Germany

[73] Assignee: Kraftwerk Union Aktiengesellschaft, Mülheim, Fed. Rep. of Germany

[21] Appl. No.: 34,436

[22] Filed: Apr. 30, 1979

Related U.S. Application Data

[63] Continuation of Ser. No. 836,975, Sep. 27, 1977, abandoned.

[30] Foreign Application Priority Data

Sep. 28, 1976 [DE] Fed. Rep. of Germany ....... 2643632

[51] Int. Cl.² .................. B23P 15/26; B65H 1/04
[52] U.S. Cl. .................. 414/745; 29/157.3 C; 29/726; 221/71; 414/14; 414/395
[58] Field of Search .............. 414/395, 14, 745, 746; 221/70, 71, 72, 73, 74; 248/74; 29/726, 727, 157.3 C, 281.4

[56] References Cited

U.S. PATENT DOCUMENTS

| 616,441 | 12/1898 | Dunham | 221/72 |
| 1,925,502 | 9/1933 | Schaeffer | 221/72 |
| 2,186,302 | 1/1940 | Martin | 221/72 |
| 2,503,518 | 4/1950 | Slaughter | 18/59 |
| 2,864,938 | 12/1958 | Shaw et al. | 221/70 |
| 3,574,917 | 4/1971 | Miyazaki | 29/202 |
| 3,611,656 | 10/1971 | Chidsey, Jr. | 53/3 |
| 3,807,675 | 4/1974 | Seckerson et al. | 248/74 A |

FOREIGN PATENT DOCUMENTS

298428 6/1919 Fed. Rep. of Germany.
957717 1/1957 Fed. Rep. of Germany ............ 221/74

*Primary Examiner*—John J. Love
*Assistant Examiner*—Ross Weaver
*Attorney, Agent, or Firm*—Herbert L. Lerner

[57] ABSTRACT

Device for feeding tubes into a tube-insertion machine for heat exchangers such as steam condensers, especially, includes vertically disposed flexible belt means formed with respective holders for the tubes, the flexible belt means and the holders connecting the tubes to one another in mutually parallel disposition.

7 Claims, 6 Drawing Figures

DEVICE FOR FEEDING TUBES FOR HEAT EXCHANGERS

This is a continuation of application Ser. No. 836,975, filed Sept. 27, 1977, now abandoned.

The invention relates to a device for feeding tubes for heat exchangers.

In the assembly of condensers and other heat exchangers for steam power plants, normally a great number of tubes, up to several tens of thousands, must be inserted through the corresponding tube base and the condenser supporting walls. Due to the considerable operational expense required in this regard, a transition has already been made heretofore to slide the tubes mechanically into the condensers. A disadvantage of this tube insertion machine is, however, that the individual tubes must be supplied manually to this machine, as was required heretofore, which demands additional operating power and forces.

It is accordingly an object of the invention to provide of the foregoing general type, with which such tubes may be continuously and automatically fed to the tube insertion machine.

With the foregoing and other objects in view, therein is provided, in accordance with the invention, a device for feeding tubes into a tube-insertion machine for heat exchangers such as steam condensers, especially, comprising vertically disposed flexible belt means formed with respective holders for the tubes, the flexible belt means and the holders connecting the tubes to one another in mutually parallel disposition.

Through this flexible mutual coupling of the tubes, they can, after the first thereof are inserted in the machine, be drawn continuously or successively out of a transport receptacle and fed to the tube insertion machine.

In accordance with another feature of the invention, the holders surround the respective tubes with clearance, and thereby permit them to be readily slid out therefrom.

In accordance with a further feature of the invention, the belt means are formed of alternatingly flat sections and ring-shaped sections for lateral insertion of respective tubes therein.

In accordance with an added feature of the invention, the belt means comprise two belt lengths wave-shaped in sections, the two belt lengths being connected to one another with the wave-shaped sections thereof juxtaposed to form respective circular openings for receiving the tubes therein.

In accordance with an additional feature of the invention, the belt means comprise a flat belt and a belt wave-shaped in sections, the belts being flatly disposed on one another so as to close the wave-shaped sections, wherein the tubes are, respectively, receivable.

In accordance with another alternative feature of the invention, the belt means comprise a flat belt and substantially U-shaped brackets fastened at spaced intervals from one another to the flat belt, the brackets having outwardly extending, free legs between which the tubes are, respectively, clamped.

In accordance with a concomitant feature of the invention, the free legs between which each of the respective tubes are clamped are, respectively, from mutually adjacent brackets.

Other features which are considered as characteristic for the invention are set forth in the appended claims.

Although the invention is illustrated and described herein as embodied in device for feeding tubes for heat exchangers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a broadly diagrammatic view of a tube-feeding or tube-inserting machine, according to the invention, in operative setting; and FIGS. 2 to 6 are enlarged fragmentary views of various embodiments of flexible belts for connecting the tubes.

Referring now to the drawing and first, particularly, to FIG. 1 thereof, there are shown two lifting and wind-up devices 2 and 3 which are capable of traveling horizontally in direction into the plane of the drawing of FIG. 1 and parallel to a condenser tube base 1. Devices 2 and 3 carry a conveyor receptacle 4 wherein tubes that are to be inserted into the condenser are stored.

To continuously and automatically feed the tubes 7 to a tube-inserting device 5, the tubes 7, in accordance with the invention, are connected to one another by flexible belts 6, as will be explained in greater detail hereinafter, and are held in corresponding holders 8 provided in these belts 6. These belts 6 can be slipped beforehand by the manufacturer onto the tubes 7 so that the tubes 7 can be delivered already completely connected to the conveyor receptacles 4.

The belts 6 studded with the tubes 7 can then be drawn upwardly by wind-up devices 9 in the upper part of the lifting and wind-up devices 2 and 3 until the first tube 7 is seized by the backwardly driven drawing-in device 10 and fed to friction wheels 11 of the tube-inserting device 5. These friction wheels 11 then force the respective tube 7 through the corresponding opening 12 formed in the condenser tube base 1 and into the condenser or the heat exchanger to be furnished therewith. The empty belts 6 are then continuously wound-up by the devices 9 and can be used again thereafter.

Several possible embodiments of such belts are described hereinafter. It should be noted, however, that other possible means of connection are conceivable within the scope of the invention.

Figure 2:
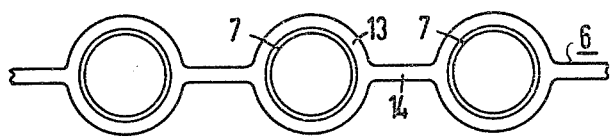

According to FIG. 2, the embodiment of the belt 6 illustrated therein is formed alternatingly of a flat, rectilinearly running section 14 and an annular or ring-shaped section 13 into which the individual tubes 7 are inserted. The ring-shaped sections 13 should have a given amount of play relative to the tubes 7 in order to facilitate the insertion and removal of the tubes 7. This is all the sooner possible since there is no danger of the tubes 7 sliding laterally out of the ring-shaped sections 13 when guiding them into the tube-insertion machine 5, because the belts 6 are always guided in vertical direction. The belts 6 may be formed of synthetic material or of suitable elastic or resilient metal.

Figure 3:
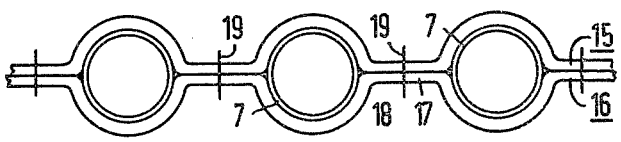

In the embodiment of FIG. 3, the belt is formed of two belt lengths 15 and 16 which, respectively, have successively straight sections 17 and semicircular wave-shaped sections 18. The respectively wave-shaped sections 18 of the two belt lengths 15 and 16 are disposed opposite one another so that the tubes 7 can be inserted, respectively, into the circular opening that is formed by the pairs of juxtaposed semicircular wave-shaped sections 18. The belt lengths 15 and 16 are, advantageously connected to one another in the region of the straight sections 17 thereof by diagrammatically indicated connecting elements 19 such as rivets or similar fasteners, for example.

Figure 4:
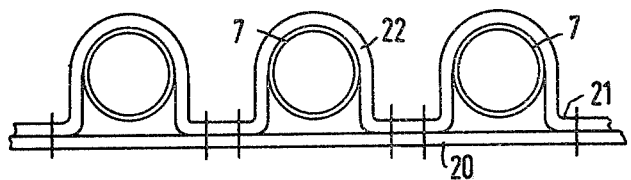

In the embodiment shown in FIG. 4, an even or flat belt 20 and a belt 21 wave-shaped in sections with substantially semicircular arcs 22 flatly disposed on one another are mutually connected, the tubes 7 being, also in this embodiment, readily insertable into the arcs 22.

Figure 5:
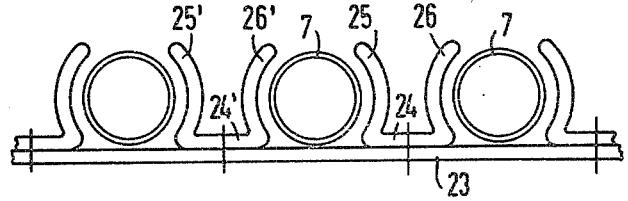

Another possible embodiment is shown in FIG. 5 wherein substantially U-shaped brackets 24 are placed at suitable mutual spacings on a flat belt 23, both of the free legs 25 and 26 of the brackets 24 being advantageously inwardly curved or concave. The tubes 7 can then be clamped between the two legs 25 and 26' of respective adjacent brackets 24 and 24' with play. Such a construction of the belt has the advantage that the tubes 7 can be more readily provided with the belts by the manufacturer because they are required to be clamped therein only from above.

Figure 6:
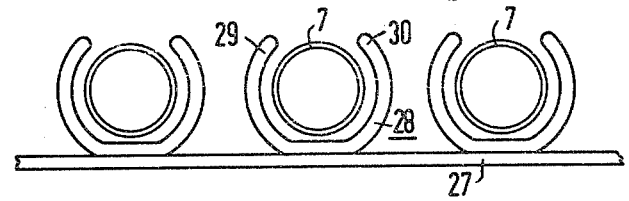

A similar embodiment is shown in FIG. 6, wherein brackets 28 are also secured to a flat belt 27, however, the legs 29 and 30 of the brackets 28 are outwardly curved or convex, and the tubes 7 are respectively clamped between the legs 29 and 30 of one and the same bracket 28.

With the hereinaforedescribed device and construction of the belts, it is thus possible, in a relatively simplified manner, to feed a large number of tubes continuously and automatically to a corresponding tube-insertion device, whereby the operating expense is quite markedly reduced.

There are claimed:

1. Device for feeding elongated tubes into a tube-insertion machine for heat exchangers such as steam condensers, especially, comprising a pair of lifting and wind-up devices mutually spaced horizontally and in horizontal alignment with the tube-insertion machine, a tube receptacle extending between and carried in common by said pair of lifting and wind-up devices, a pair of flexible belts formed, respectively, with a plurality of holders for tubes received in said receptacle for connecting the tubes to one another in mutually parallel disposition, said pair of flexible belts being respectively liftable so as to be vertically disposed and stepwise windable upwardly by said pair of lifting and wind-up devices so as to align the mutually parallel elongated tubes respectively with the tube-insertion machine whereby the tubes may be withdrawn by the tube-insertion machine from the respective holders.

2. Device according to claim 1 wherein said holders surround the respective tubes with clearance.

3. Device according to claim 1 wherein said belts are formed of alternatingly flat sections and ring-shaped sections for lateral insertion of respective tubes therein.

4. Device according to claim 1 wherein at least one of said belts comprise two belt lengths wave-shaped in sections, said two belt lengths being connected to one another with the wave-shaped sections thereof juxtaposed to form respective circular openings for receiving the tubes therein.

5. Device according to claim 1 wherein at least one of said belts comprise a flat belt length and a belt length wave-shaped in sections, said belt lengths being flatly disposed on one another so as to close said wave-shaped sections, wherein the tubes are, respectively, receivable.

6. Device according to claim 1 wherein at least one of said belts comprise a flat belt length and substantially U-shaped brackets fastened at spaced intervals from one another to said flat belt length, said brackets having outwardly extending, free legs between which the tubes are, respectively, clamped.

7. Device according to claim 6 wherein the free legs between which each of the respective tubes are clamped are, respectively, from mutually adjacent brackets.

* * * * *